(12) United States Patent
Cote (10) Patent No.: US 7,621,576 B2
(45) Date of Patent: Nov. 24, 2009

(54) MATTRESS DISPLAY VEHICLE

(75) Inventor: Michael Cote, Chicago, IL (US)

(73) Assignee: Sleep Squad, LLC, Chicago, IL (US)

( * ) Notice: Subject to any disclaimer, the term of this patent is extended or adjusted under 35 U.S.C. 154(b) by 300 days.

(21) Appl. No.: 11/831,685

(22) Filed: Jul. 31, 2007

(65) Prior Publication Data

US 2008/0052823 A1    Mar. 6, 2008

Related U.S. Application Data

(60) Provisional application No. 60/834,536, filed on Jul. 31, 2006.

(51) Int. Cl.
*B60P 3/00* (2006.01)
(52) U.S. Cl. .................................. 296/24.3
(58) Field of Classification Search ............... 296/24.3, 296/168; 211/28
See application file for complete search history.

(56) References Cited

U.S. PATENT DOCUMENTS

| | | | | |
|---|---|---|---|---|
| 1,585,937 A | * | 5/1926 | Paul | 211/28 |
| 2,076,848 A | * | 4/1937 | Keiver | 211/28 |
| 2,273,409 A | * | 2/1942 | Livingston | 211/28 |
| 2,444,776 A | * | 7/1948 | Kalning et al. | 211/28 |
| 3,185,306 A | * | 5/1965 | Delaney | 211/28 |
| 3,357,569 A | * | 12/1967 | Goodman et al. | 211/28 |
| 4,678,085 A | * | 7/1987 | Sando | 211/28 |
| 4,826,235 A | * | 5/1989 | Zwick | 296/170 |
| 5,833,294 A | * | 11/1998 | Williams et al. | 296/24.32 |
| 6,220,457 B1 | * | 4/2001 | Resta | 211/28 |
| 6,394,533 B1 | * | 5/2002 | Ladell et al. | 296/182.1 |
| 6,817,653 B2 | * | 11/2004 | Ropp | 296/186.2 |
| 7,114,754 B2 | * | 10/2006 | Morello | 296/24.32 |
| 2009/0026735 A1 | * | 1/2009 | Watzke | 280/652 |

* cited by examiner

*Primary Examiner*—Kiran B. Patel
(74) *Attorney, Agent, or Firm*—Marshall, Gerstein & Borun LLP (57) ABSTRACT

A mattress display vehicle has a curbside side door that opens to a central display area. Large windows visually open the space and an independent power source enables a heating or air-conditioning unit to be operated when the vehicle engine is turned off. A rack extends between the fore and aft storage areas. One of the storage areas has a relatively tall storage compartment and can be used for storing king-sized mattresses, and the other storage has horizontal storage slots stacked with a shorter storage compartment. Two dollies can be shuttled back and forth between lower storage compartments in the storage areas, carrying different mattresses to the prospective purchaser. The dolly has telescoping members that slide in and out of cross members at each end of the dolly. Lateral bed rails are mounted on the ends of the telescoping members, and can be locked in different positions for mattresses of different widths using locking pins. Risers can be used to lift the dolly and the mattress to a standard height. The horizontal slots in the storage areas can be used to display three or more different mattresses on the dollies.

10 Claims, 12 Drawing Sheets

MATTRESS DISPLAY VEHICLE

BACKGROUND

This disclosure relates generally to mobile showrooms, and specifically to mobile showrooms for displaying and demonstrating mattresses.

Mattress shopping can present a daunting task to a consumer. Many options of mattress configurations can be confusing and difficult to access and compare. In addition, visiting a mattress showroom can be inconvenient and time consuming. Accordingly, there is a need for an efficient way for consumers to shop for mattresses at a convenient location, such as near their homes, and for comparing mattress options in a convenient fashion. While it is known that trucks can be used to deliver mattresses, it has been a challenge to develop a vehicle that is both practical and inviting to consumers.

SUMMARY

The mattress display vehicle disclosed here provides a welcoming, inviting setting that also facilitates quick, convenient, and easy comparison of mattresses. (For convenience, the term "mattress" is generally used in this document to refer either to a mattress, or to a set of box springs, or to a combination of both a mattress and box springs.)

The new vehicle provides a welcoming setting by providing a curbside side door that opens to a central display area. Large windows help to visually open the space and an independent power source enables a heating/air-conditioning unit to be operated even when the vehicle engine is turned off.

The convenience of the vehicle is enhanced by fore and aft storage areas for mattresses and a rack that extends between the fore and aft storage areas (across the central display area). One of the storage areas has a relatively tall storage compartment and can be used for storing king-sized mattresses. The other storage area has horizontal storage slots stacked with a shorter storage compartment.

Two dollies can be shuttled back and forth between lower storage compartments in the storage areas, carrying different mattresses to the prospective purchaser. The horizontal slots can be used to display three mattresses on the dollies.

A convenient, low-profile dolly can be built using telescoping members that slide in and out of cross members at each end of the dolly. Lateral bed rails are mounted on the ends of the telescoping members, and can be locked in different positions for mattresses of different widths using locking pins. Risers can be used to engage and lift the dolly and the mattress to a standard height.

DETAILED DESCRIPTION

FIGS. 1 through 5 depict a mattress display vehicle 10 that includes a tractor/cab 12 and a main cabin 14. The main cabin 14 is further depicted in FIGS. 6 and 7, and includes a central display area 16, a fore storage area 18, and an aft storage area 20. A side door 24 opens to the central display area 16. A curbside side-opening door like this may be more appealing to customers than an entry through the rear of the vehicle. The illustrated door can be accessed via a foldout exterior stair and landing assembly 25 such as the one seen in FIG. 8. This assembly folds into a stair storage compartment 26 beneath the door (see FIG. 1A). Separate hand rails 27 can be stored in the rear of the vehicle. An optional roll-up canopy 28 can also be provided to make entry to the vehicle even more attractive and inviting.

Figure 1A:
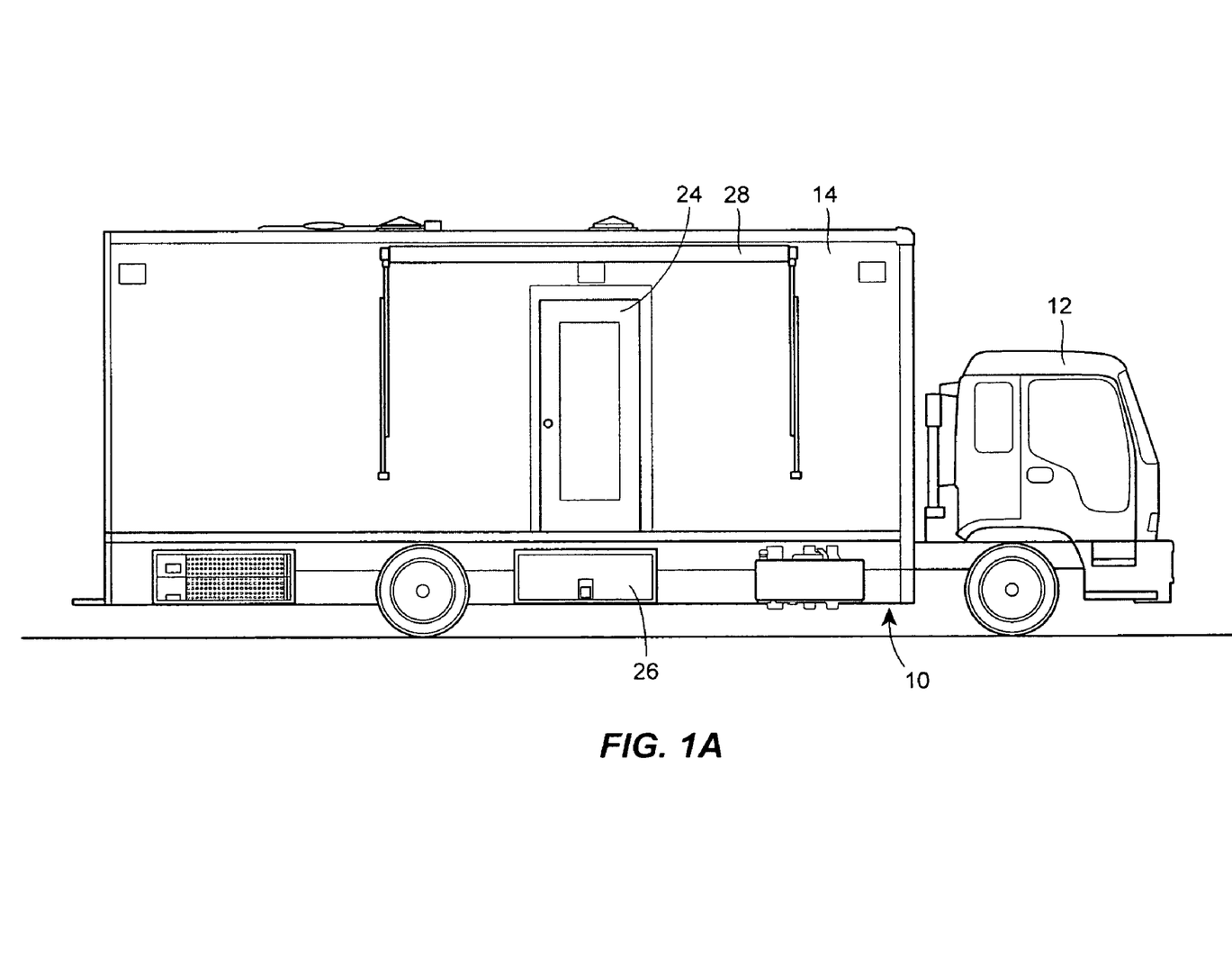
FIG. 1A is a side elevational view of one kind of a mattress display vehicle that uses the invention.
Figure 1B:
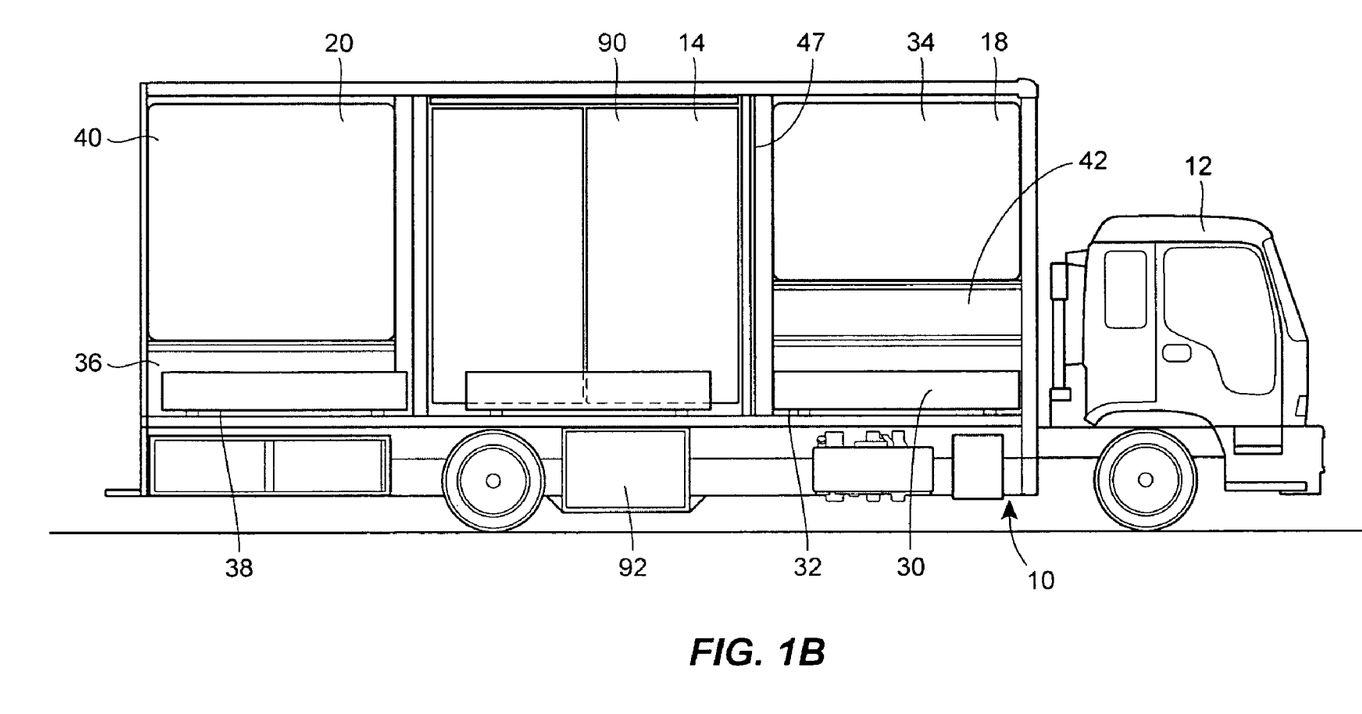
FIG. 1B is a partial sectional side view of the vehicle of FIG. 1A, showing the interior of the main cabin.
Figure 2A:
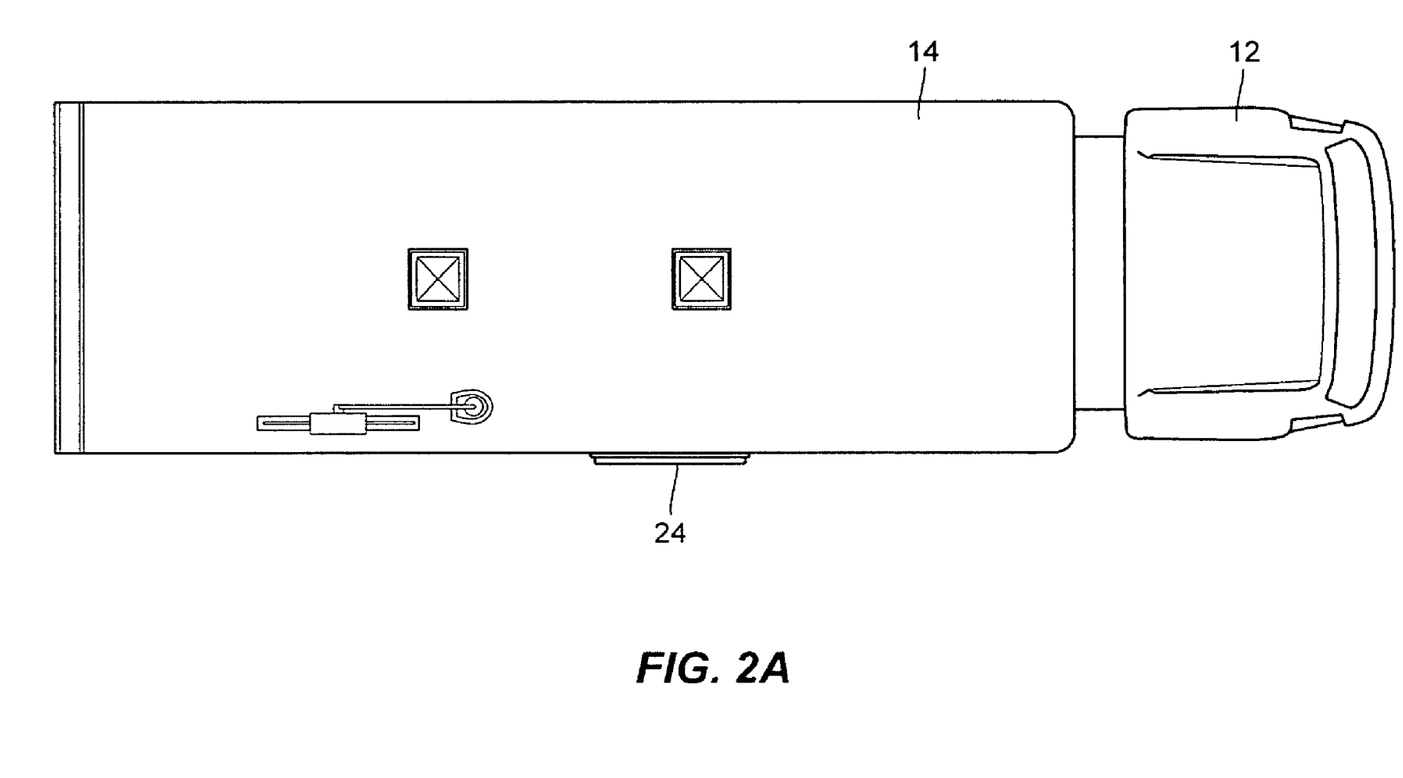
FIG. 2A is a plan view of the mattress display vehicle of FIG. 1.
Figure 2B:
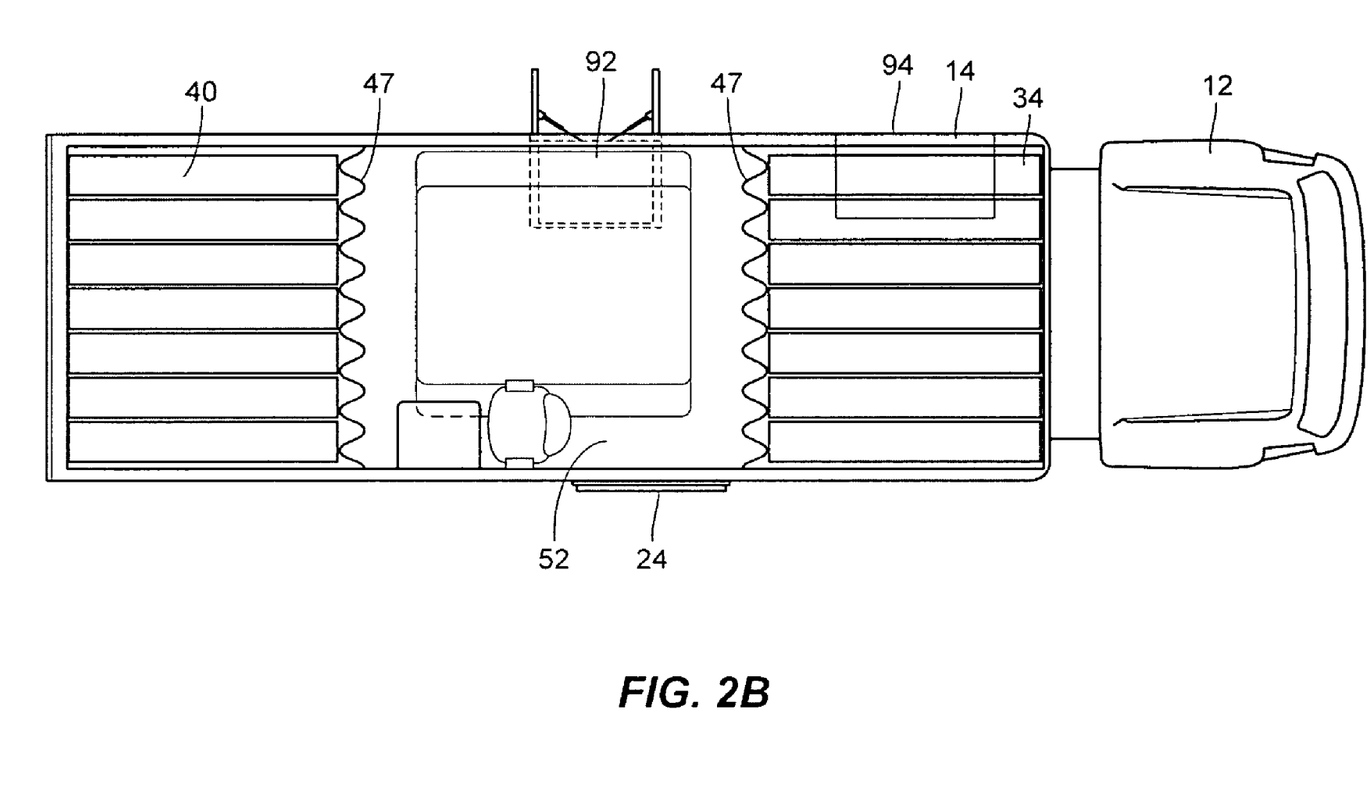
FIG. 2B is a sectional side view of the vehicle of FIG. 2A, showing the interior of the main cabin.
Figure 3A:
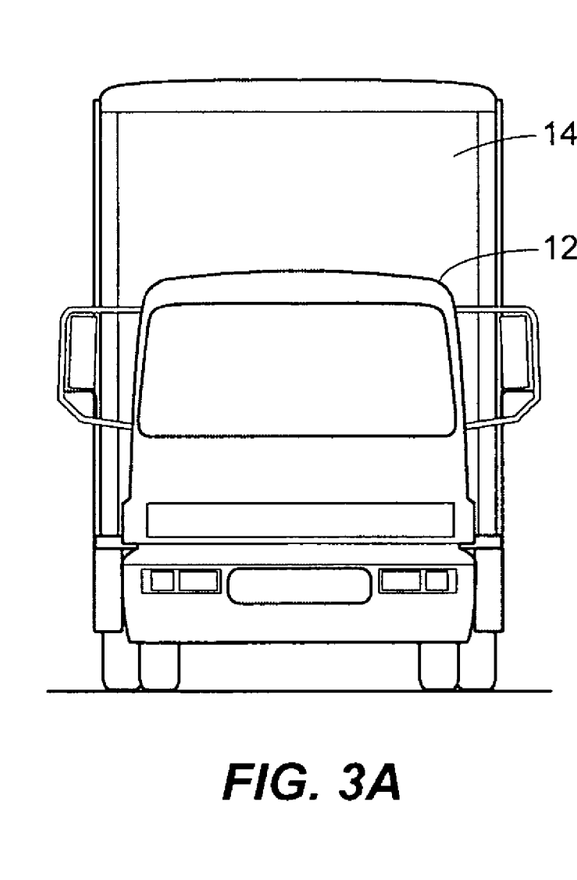
FIG. 3A is a partial front elevational view of the mattress display vehicle of FIG. 1.
Figure 3B:
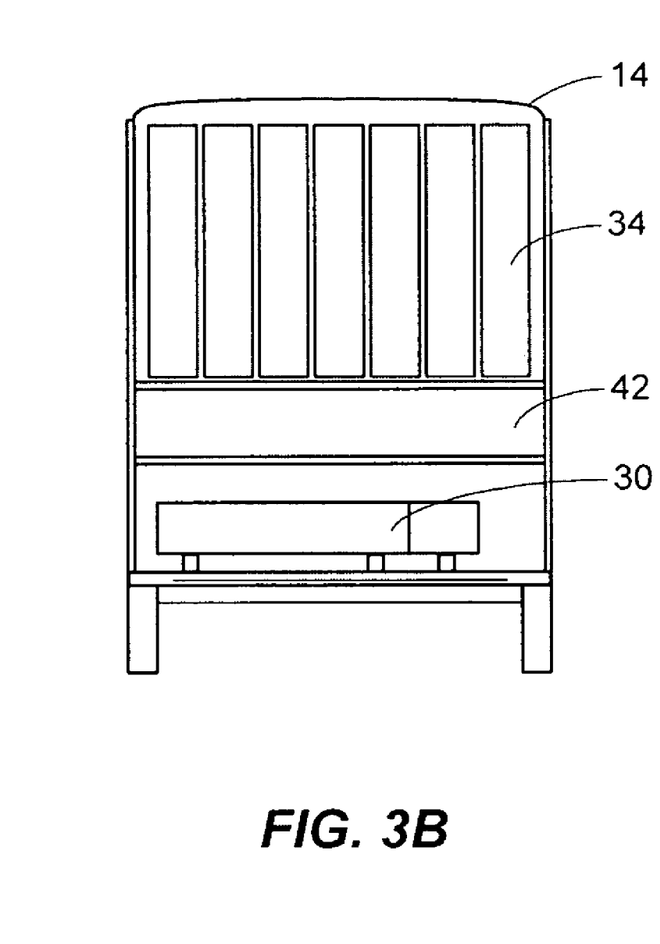
FIG. 3B is a sectional front view of the portion of the vehicle of FIG. 3A, showing the interior of the main cabin.
Figure 4A:
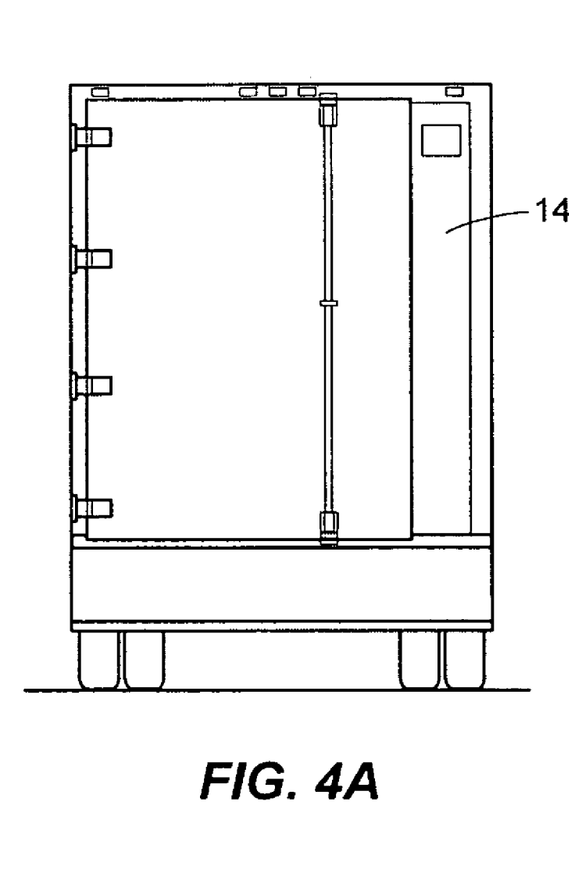
FIG. 4A is a rear elevational view of the portion of the vehicle of FIG. 3.
Figure 4B:
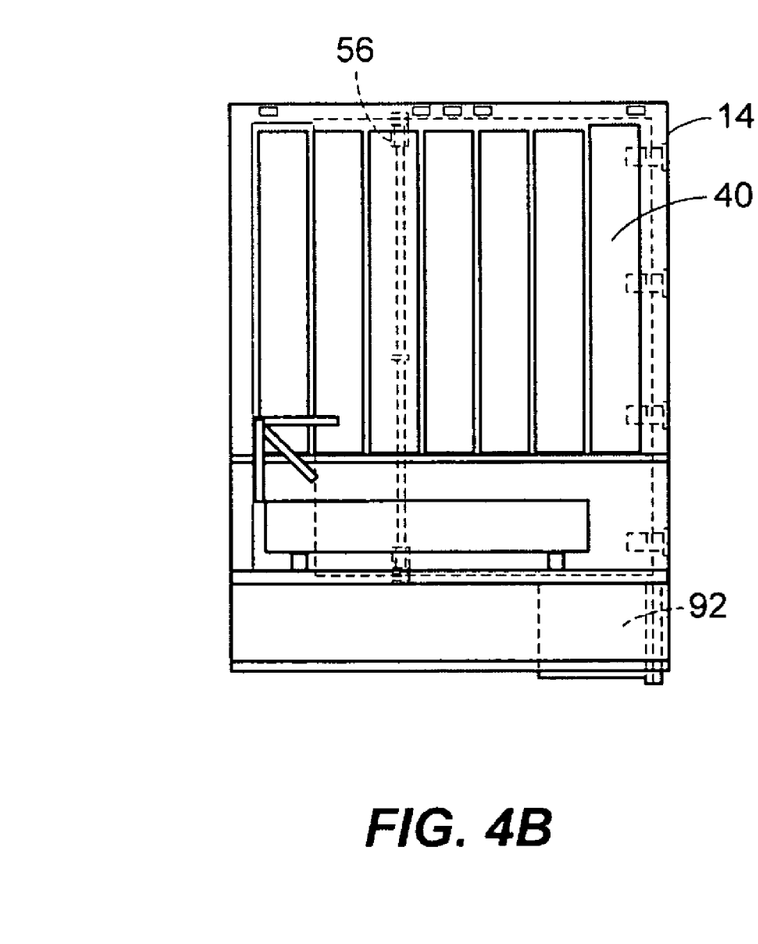
FIG. 4B is a sectional rear view of the portion of the vehicle of FIG. 4A.
Figure 5A:
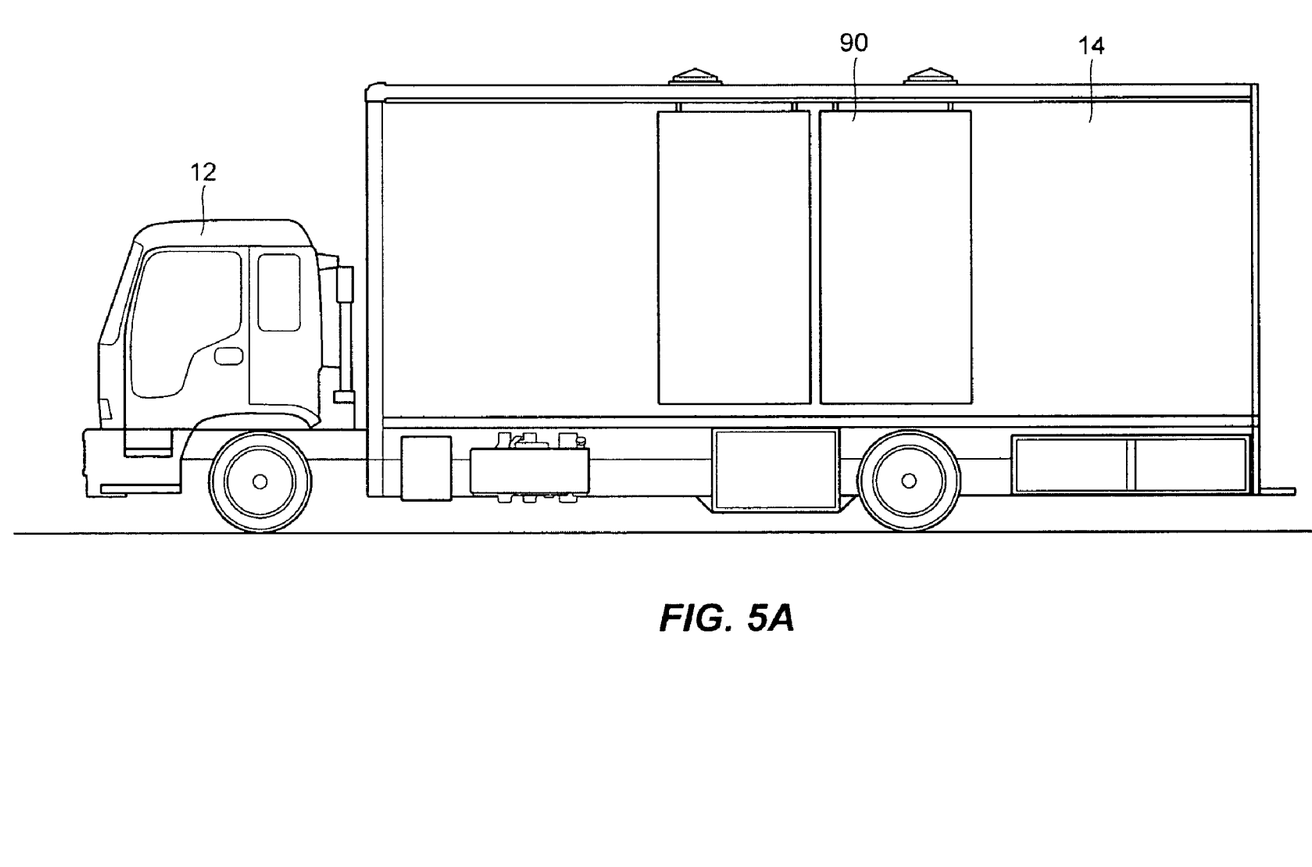
FIG. 5A is an opposite side elevational view of the vehicle of FIG. 1.
Figure 5B:
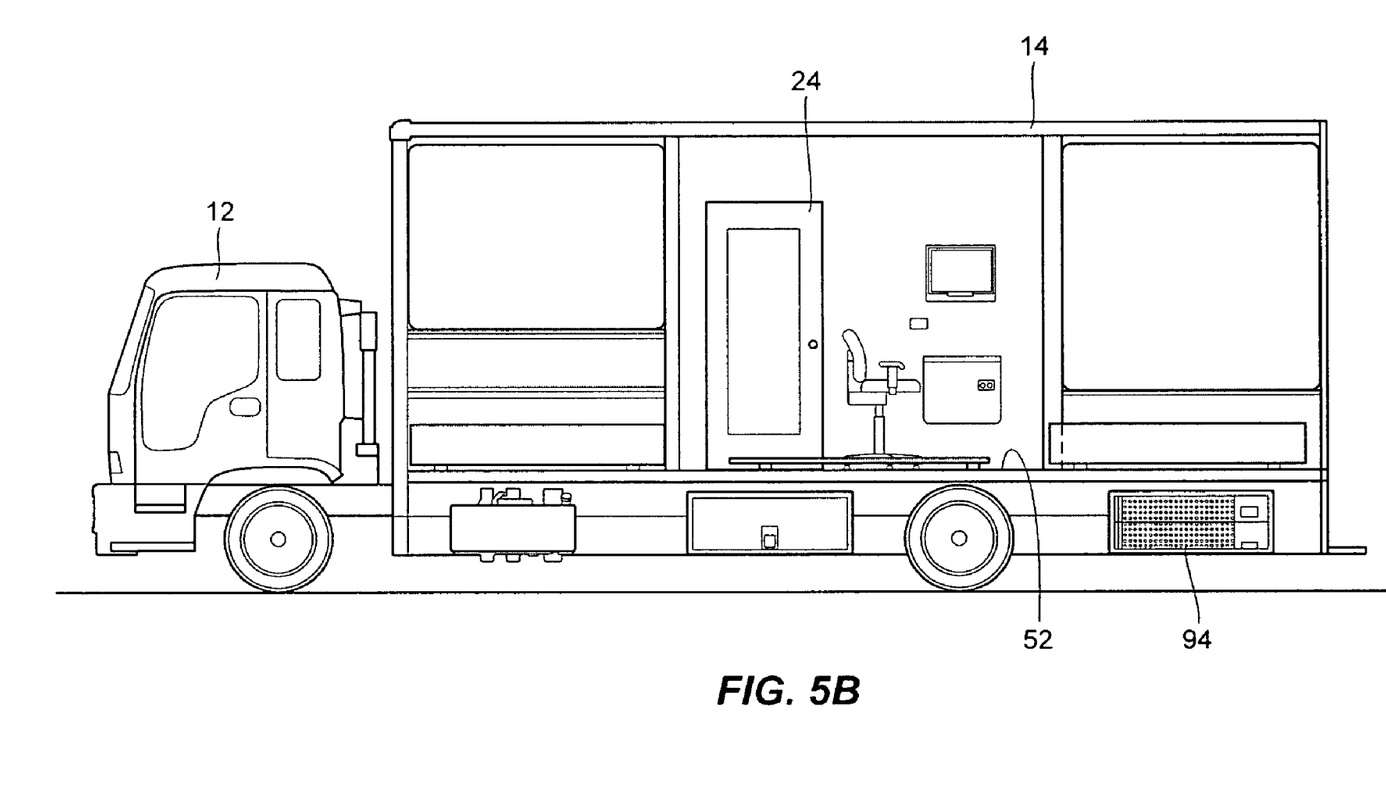
FIG. 5B is a sectional side view of the vehicle of FIG. 5A, showing the interior of the main cabin.

As seen in FIG. 1B, the illustrated fore storage area 18 includes a forward lower horizontal storage compartment 30 that is sized to accommodate a mattress on a forward dolly 32. It also has an upper storage compartment 34 that is adapted to contain a set of mattresses stacked in a vertical configuration, as best seen in FIGS. 2B and 7.

The forward dolly 32 can be arranged in a variety of ways. For example, if the primary intent is to display mattresses alone, the dolly could be provided with box springs or structure that serves as a set of box springs. Alternatively, and as is the case here, the dolly could be provided with a simple bed frame on which both box springs and a mattress can be added or replaced as desired. Details of one possible dolly will be described in more detail below.

Figure 7:
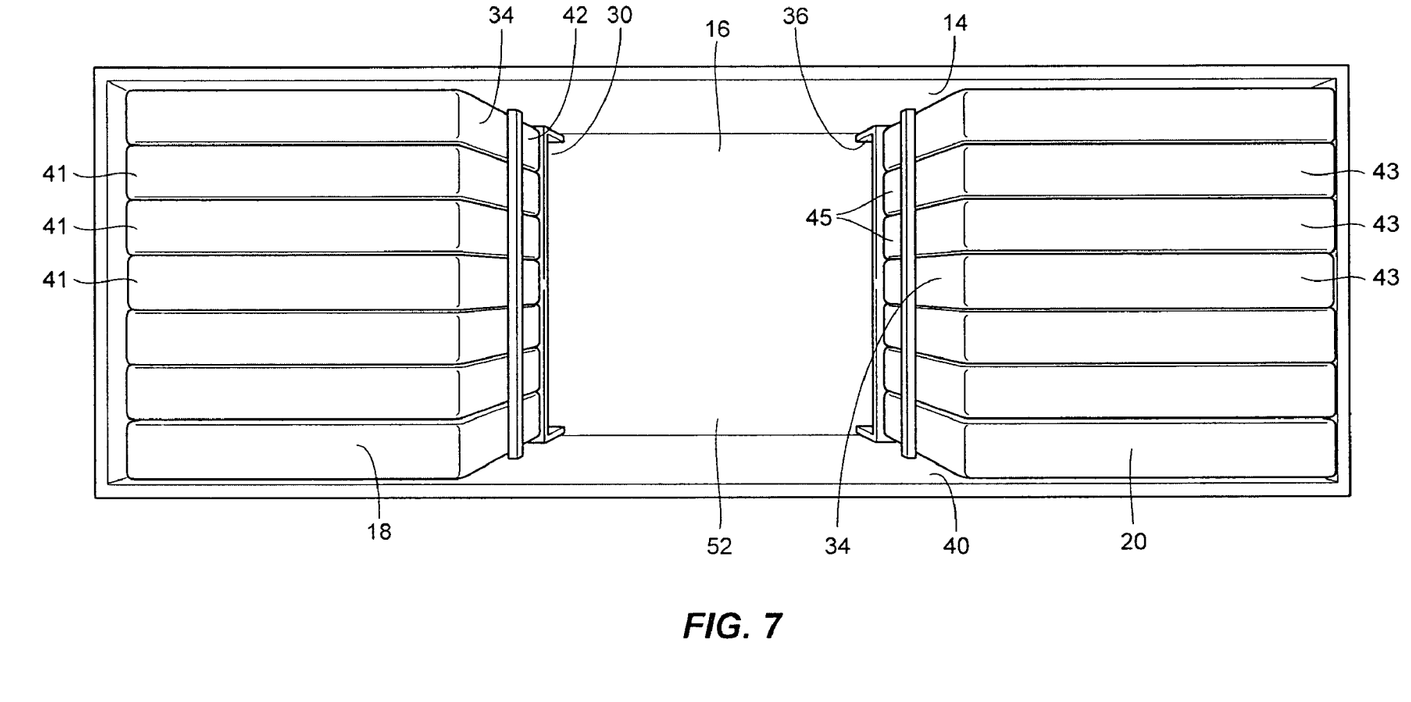
FIG. 7 is another cut-away perspective view, this one showing the fore and aft storage areas of the main cabin seen in FIG. 6.
Figure 8:
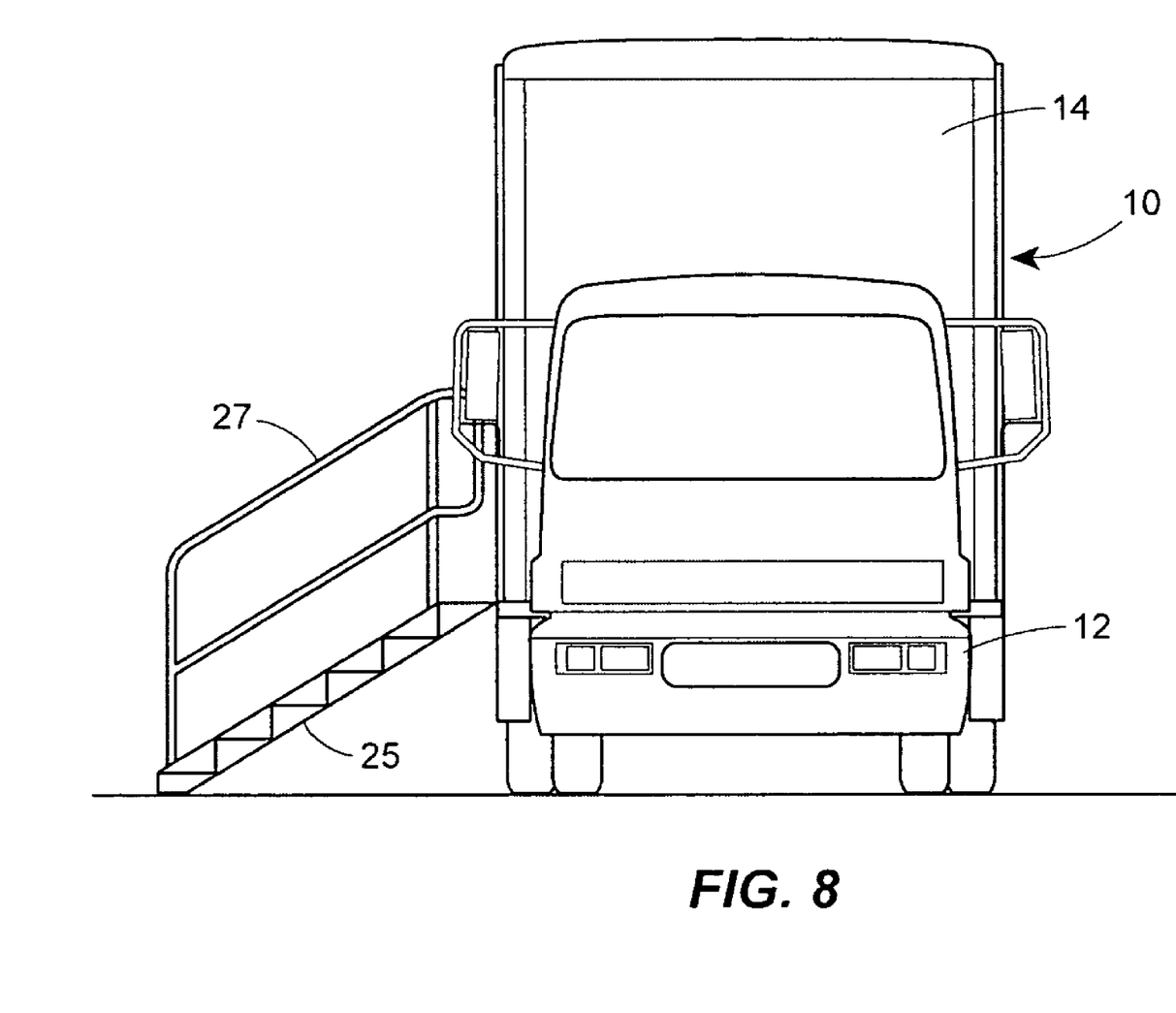
FIG. 8 is a side view of a possible stair and landing assembly that can be used with the vehicle of FIG. 1.

The illustrated aft storage area 20 includes a lower horizontal storage compartment 36 that is sized to accommodate a rear dolly 38, and an upper mattress storage compartment 40 that is adapted to contain another set of vertically oriented mattresses, as best seen in FIG. 7. In this embodiment of the invention, the upper mattress storage compartment is a queen-sized compartment that is at least 62" high. This height is convenient for accommodating the width of queen-sized mattresses, while allowing room beneath the compartment for one or more horizontal storage slots 42, such as the one seen in FIG. 1B. A full-size mattress is 53" wide, so a compartment that is at least 55" high (a "standard height compartment") would also be advantageous. The horizontal slots are preferably at least 78" wide, so that they can accommodate the full width of a king-sized mattress.

In the illustrated vehicle, the upper storage compartment 40 in the aft storage area 20 is a king-sized compartment that is at least 78" high.

Open ends 45 of the compartments face the central display area 16. The open ends may be covered by retractable curtains 47 (FIGS. 1B and 2B). Curtains make the display area look more comfortable, while still providing ready access to additional mattresses. Vertical dividers are optional in either compartment.

Figure 6:
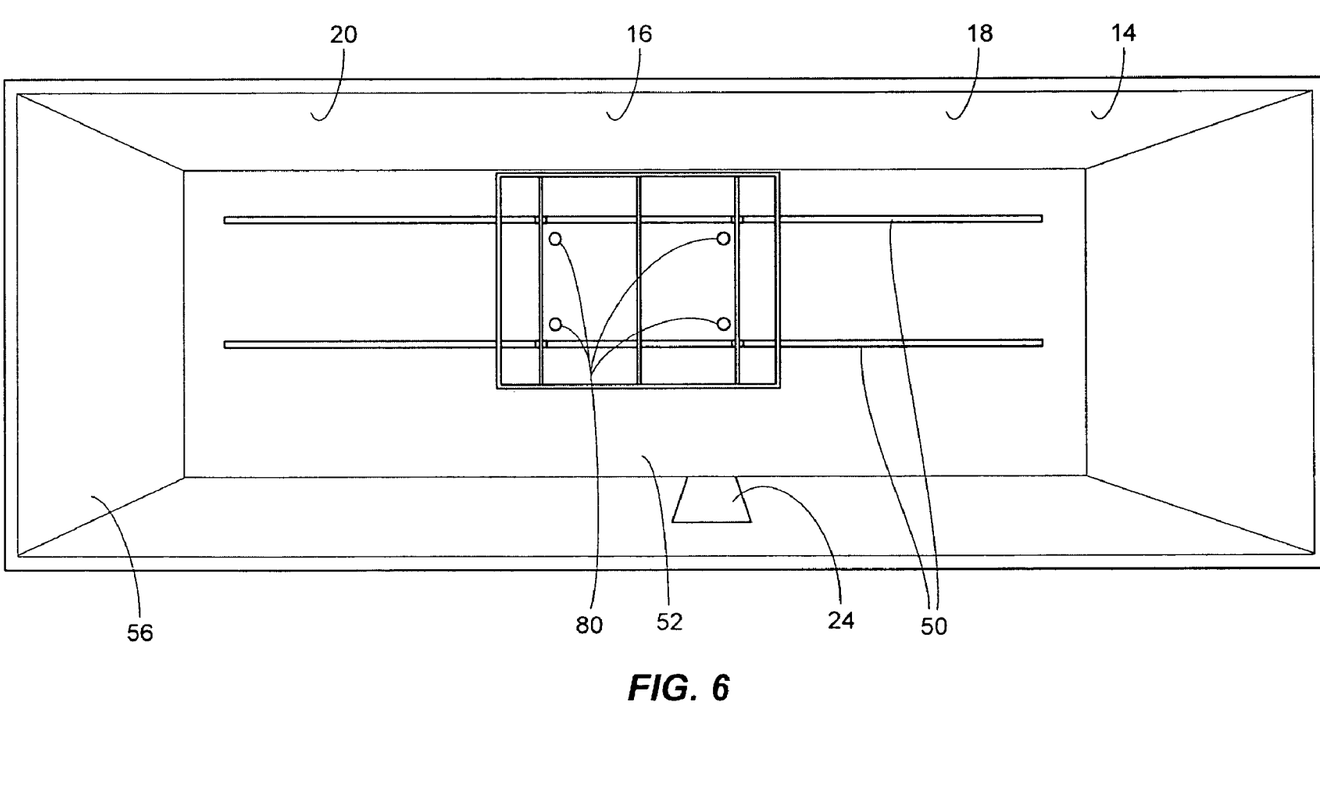
FIG. 6 is a cut-away perspective view showing the floor of the main cabin of the mattress display vehicle of FIG. 1.

As best seen in FIG. 6, the floor 52 of the illustrated main cabin 14 has a rack that takes the form of a pair of rails 50 in the floor. Each of the illustrated dollies 32, 38 has rollers 54 adapted to run on the rails. The rails 50 extend substantially the entire length of the main cabin 14, from the aft storage area 20, across the central display area 16, to the fore storage area 18. This configuration facilitates the smooth and simple movement of the dollies 32, 38 between the central display area 16 and the lower storage compartments of the fore and aft storage areas 18, 20.

The dollies 32, 38 are used to display mattresses. In the illustrated vehicle, mattresses are displayed with the head and foot of the mattress toward the storage areas, and one side facing the side door 24. The illustrated rails are spaced between 2 and 4 feet apart. This spacing is convenient for moving all standard sizes of beds.

Preferably, each of the dollies is configured so that, when it is positioned in the central display area 16, it holds a mattress at a convenient height for consumer evaluation. This can be done, for example, by providing a relatively tall dolly or by using a relatively short dolly and rails 50 that are elevated above the floor 52 in the central display area. Another possibility, the use of risers, is discussed below.

In operation, a customer can use an Internet-based web site to select a group of mattresses of interest (e.g., based on size, cost, style, and/or brand of mattress). The customer communicates his or her selection by telephone, email, mail, and/or an Internet-based order form. The appropriate mattresses are then brought to the customer for evaluation in the mattress display vehicle 10.

To display and demonstrate mattresses in the mattress display vehicle 10, mattresses can be placed on each of the dollies 32, 38. One of the dollies can be moved into the central display area 16, while the other dolly is stowed in the lower storage compartment 30, 36 of one of fore or aft storage area 18, 20. A customer can be shown two mattresses by using the dollies to shuttle the mattresses between the central display area and the fore and aft storage areas.

Additional mattress choices can be displayed on the dollies 32, 38 by replacing one or both of the mattresses on the dollies with one or more of the mattresses stored in the fore or aft storage areas 18, 20. For example, a mattress can be easily moved from a dolly in the central display area to an open horizontal storage slot 42, leaving box springs on the dolly. A mattress in another horizontal slot can then be moved onto the box springs. To display the mattress on the other dolly, the dolly and box springs currently in the central display area can be shuttled from the central display area into the lower compartment beneath the horizontal slots, leaving the central display area unoccupied. The dolly from the opposite lower compartment can then be moved into the central display area. For ease of replacing mattresses on the dolly, the edge of the horizontal slot should generally be within 3 feet of the top of the dolly or box springs.

The upper mattress storage compartments 34 and 40 can be used to store inventory. Preferably, the vehicle is also provided with equipment for processing the purchase of a selected mattress, so it can be delivered immediately.

A side-swinging door 56 is provided at the rear of the illustrated main cabin 14. This door facilitates loading and unloading mattresses. Other types of doors, such as a roll-up door, might also be used.

Figure 9:
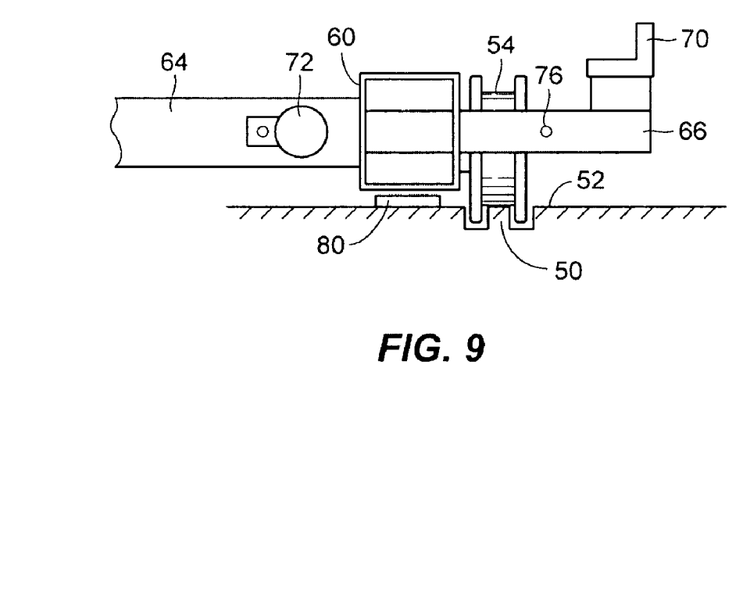
FIG. 9 is a detailed end view of a corner of one possible dolly that can be used in the invention.
Figure 10:
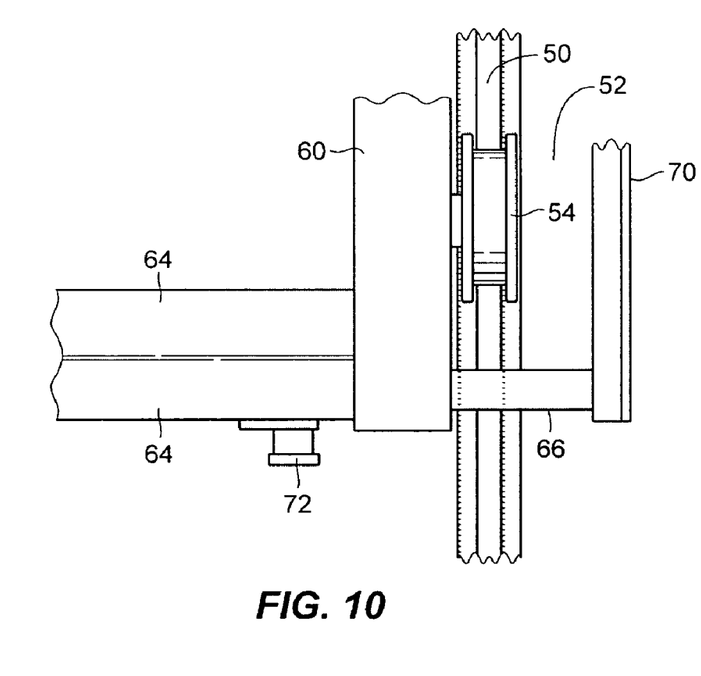
FIG. 10 is a partial plan view of the corner of the dolly seen in FIG. 9.

FIGS. 9 and 10 provide more detail on a possible dolly that can be used in the vehicle. The dolly illustrated here is approximately 80" long, corresponding with the standard length of a bed. The rollers 54 are mounted within a few feet of each end of a pair of tubular frame members 60 that run parallel to the rails 50. In this example, the rails are mounted in recesses in the floor 52, with the top of the rails being even with the top of the floor in the central display area 16. This minimizes any possible tripping hazard.

At each of the two ends of the dolly, a pair of tubular cross members 64 extends between the two frame members 60. These two cross members are positioned one in front of the other, so that they are both at the same height. (The two cross members at the other end of the dolly also arranged at the same height.) A telescoping member 66 is arranged to slide within each cross member, and extends outwardly from the frame members, perpendicular to the rails 50. Each corner of the dolly has its own telescoping member.

On each side of the dolly, a lateral bed rail 70 is mounted to the projecting end of each of the two telescoping members 66 on that side of the dolly. These bed rails run parallel to the sides of the dolly, and provide a framework for mounting and supporting the lateral sides of a mattress. Different widths of mattresses can be accommodated by sliding the telescoping members into and out of the cross members 64 to provide the appropriate distance between the rails to support the selected mattress.

A pin 72 is mounted on each of the cross members 64. In the illustrated corner, the pin is mounted in front of the cross member. The pin on the adjacent cross member, which receives the telescoping member for the opposite corner of the dolly, could be mounted on the back of that cross member. The illustrated pin slides forward and back, and can be spring-loaded so that it is biased to project into the interior of the cross member and into one of a series of holes 76 in the telescoping member 66 in that cross member. Engagement of the pin into one of the holes in the telescoping member locks the telescoping member in position within the cross member, fixing the position of the bed rail 70 connected to that telescoping member. One hole in the telescoping member can be arranged so that the bed rail is in a position suitable for supporting a full-sized twin mattress (i.e., a position in which the bed rails are 54" apart), while another hole in that member corresponds with a position suitable for supporting a queen-sized mattress (i.e., a position in which the bed rails are 60" apart) and another hole corresponds with a position suitable for supporting a king-sized mattress (i.e., a position in which the bed rails are 76" apart).

In most circumstances, it might be preferred to adjust the bed rails 70 on both sides of the dolly by equal amounts (i.e., when adjusting from queen-sized to king-sized, move each bed rail out 8 inches). In some circumstances, however, (for example, when room on one side of the dolly is limited) it might be preferred to move each bed rail by different amounts, or even to make all the adjustments on one side only, leaving the other bed rail in the same position.

The dolly seen in FIGS. 9 and 10 is low in profile, less than 12 inches from the horizontal surface of the bed rail 70 to the part of the roller 54 that rides on top of the rail 50. This is advantageous for storage purposes. It enables the lower storage compartments 30, 36 to be no more than two feet high and still be tall enough to accommodate a mattress and box spring on top of the dolly. However, this low profile could result in the mattresses being presented in an unusually low and awkward position. A set of four risers 80 can be provided in the floor 52 (see FIGS. 8 and 9) to raise the dolly to a more normal position, one riser for each corner of the dolly. The riser seen in FIG. 9 is a cylindrical member, which can be selectively raised from and lowered back into the floor. The top of the illustrated riser fits into a pocket or hole in the bottom of the dolly, and can be used to raise the dolly up off the rack to a conventional bed height. Lowering the risers returns the dolly back onto the track, where it can be shuttled into one of the lower storage compartments 30, 36. Other arrangement could also be used for raising the dolly once it is positioned in the central display area 16.

Other features of the illustrated vehicle make it more inviting to consumers and practical to use. Two large windows 90 (FIGS. 1B and 5A) provide an open, comfortable environment. The illustrated windows are large, floor-to-ceiling windows opposite the side door. Other types of windows or window locations might also be used, but a significant advantage is gained by using a large window or windows (i.e., providing a viewing area of at least four square fee.).

An independent power source 92 (FIGS. 1B and 4B) allows one or more heating and/or air-conditioning units to be run even when the vehicle engine that drives the vehicle is turned off. This is advantageous because many jurisdictions require vehicle engines to be turned off when the vehicle is parked, and the central display area could become uncomfortably hot or cold without appropriate heating or air-conditioning. The illustrated vehicle uses a 7.5 kw, 120 volt generator stowed behind the stair storage compartment 26 beneath the central display area. Other types of generators and mounting locations could also be used.

Other features and advantages of the invention may be found from a review of the drawing figures. Although one embodiment of a mattress display vehicle has been described in this disclosure, the scope of coverage of this patent is not limited to that exact embodiment. On the contrary, this patent covers all embodiments of the teachings of the disclosure that fairly fall within the scope of the following claims and permissible equivalents.

The invention claimed is:

1. A mattress display vehicle that has:
   a central display area;
   a side door that opens to the central display area;
   mattress storage areas fore and aft of the central display area; and
   a rack that extends between the fore and aft storage areas, through the central display area, and is used to move a mattress between the central display area and one of the storage areas.

2. A mattress display vehicle as recited in claim 1, in which:
   the vehicle also has a dolly that moves across the rack between the storage areas.

3. A mattress display vehicle as recited in claim 1, that also has:
   a dolly that has rollers that ride on the rack;
   pairs of telescoping members that extend from frame members on each side of the dolly; and
   bed rails mounted on the ends of the telescoping members.

4. A mattress display vehicle as recited in claim 1, that also has:
   a dolly that has rollers that ride on the rack;
   pairs of telescoping members that extend from frame members on each side of the dolly;
   bed rails mounted on the ends of the telescoping members; and
   risers in the floor of the central display area that selectively lift the dolly off the rack and subsequently return it to the rack.

5. A mattress display vehicle as recited in claim 1, in which:
   the rack has a pair of parallel rails that extend across the floor of the central display area; and
   the parallel rails are spaced between 2 and 4 feet apart.

6. A mattress display vehicle as recited in claim 1, in which:
   one of the storage areas has a storage compartment that is at least 55 inches high; and
   the vehicle has a horizontal storage slot beneath the storage compartment.

7. A mattress display vehicle as recited in claim 1, in which:
   two horizontally-arranged, 80" wide slots are positioned, one above the other, below a storage compartment in one of the storage areas.

8. A mattress display vehicle as recited in claim 1, in which:
   the fore and aft storage areas have lower compartments that are no more than 2 feet high; and
   the rack has a low profile dolly that shuttles a mattress between the central display area and one of the lower storage compartments.

9. A mattress display vehicle as recited in claim 1, in which:
   the fore and aft storage areas have lower compartments that are no more than 2 feet high;
   two horizontally-arranged slots are positioned, one above the other, above one of the lower compartments; and
   the vehicle also has a dolly that shuttles box springs between the central display area and the lower compartment beneath the horizontally-arranged slots.

10. A mattress display vehicle as recited in claim 1, that also has:
    a vehicle engine that drives the vehicle;
    a heating or air conditioning unit that heats or cools the central display area; and
    a power source for the heating or air-conditioning unit that operates independently of the vehicle engine.

* * * * *